(12) United States Patent
Sumiyawa et al.

(10) Patent No.: US 8,343,658 B2
(45) Date of Patent: Jan. 1, 2013

(54) ALKALINE BATTERY HAVING IMPROVED HIGH RATE DISCHARGE CAPABILITY

(75) Inventors: Shinichi Sumiyawa, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/920,444

(22) PCT Filed: Mar. 15, 2010

(86) PCT No.: PCT/JP2010/001835
§ 371 (c)(1),
(2), (4) Date: Jul. 12, 2011

(87) PCT Pub. No.: WO2011/027485
PCT Pub. Date: Mar. 10, 2011

(65) Prior Publication Data
US 2011/0293999 A1    Dec. 1, 2011

(30) Foreign Application Priority Data
Sep. 7, 2009   (JP) .................................. 2009-205587

(51) Int. Cl.
*H01M 4/13*      (2010.01)
*H01M 4/50*      (2010.01)
*H01M 4/42*      (2006.01)

(52) U.S. Cl. ...................... 429/218.1; 429/224; 429/229

(58) Field of Classification Search ........................ None
See application file for complete search history.

(56) References Cited

U.S. PATENT DOCUMENTS

| | | | | |
|---|---|---|---|---|
| 5,601,946 | A * | 2/1997 | Hattori et al. ................. | 429/206 |
| 2004/0009394 | A1 * | 1/2004 | Ito et al. ........................ | 429/206 |
| 2005/0106461 | A1 * | 5/2005 | Moore et al. .................. | 429/229 |
| 2006/0172193 | A1 | 8/2006 | Iwamoto et al. | |
| 2007/0141466 | A1 | 6/2007 | Shimamura et al. | |
| 2008/0193851 | A1 * | 8/2008 | Armacanqui et al. ........ | 429/300 |

FOREIGN PATENT DOCUMENTS

| | | |
|---|---|---|
| JP | 57-182972 | 11/1982 |
| JP | 08-078017 | 3/1996 |
| JP | 2001-512284 | 8/2001 |
| JP | 2003-017077 | 1/2003 |
| JP | 2004-179044 | 6/2004 |
| JP | 2004-253276 | 9/2004 |
| JP | 2005-310616 | 11/2005 |
| JP | 2006-244989 | 9/2006 |
| JP | 2007-227011 | 9/2007 |
| WO | WO 99/07030 | 2/1999 |

OTHER PUBLICATIONS

Machine translation of JP 2005-332811, Shimamura et al., Dec. 2, 2005.*

* cited by examiner

*Primary Examiner* — Barbara Gilliam
*Assistant Examiner* — Kwang Han
(74) *Attorney, Agent, or Firm* — McDermott Will & Emery LLP

(57) ABSTRACT

A positive electrode 2 and a negative electrode 3 are contained in a battery case 1 with a separator 4 interposed therebetween. The positive electrode 2 contains manganese dioxide and an alkaline electrolyte, and the negative electrode 3 is a gelled negative electrode containing zinc powder, a gelling agent, and an alkaline electrolyte. The zinc powder contains 15% by mass or higher of fine powder with a particle size smaller than 200 mesh, and 10 to 35% by mass of coarse powder with a particle size of 20 to 80 mesh, and has a specific surface area in the range of 0.025 to 0.080 m²/g.

7 Claims, 5 Drawing Sheets

ALKALINE BATTERY HAVING IMPROVED HIGH RATE DISCHARGE CAPABILITY

RELATED APPLICATIONS

This application is the U.S. National Phase under 35 U.S.C. §371 of International Application No. PCT/JP2010/001835, filed on Mar. 15, 2010, which in turn claims the benefit of Japanese Application No. 2009-205587, filed on Sep. 7, 2009, the disclosures of which Applications are incorporated by reference herein.

TECHNICAL FIELD

The present invention relates to alkaline batteries having improved high rate discharge capability.

BACKGROUND ART

Alkaline batteries generally include a gelled negative electrode prepared by adding a gelling agent to a mixture of zinc powder and an alkaline electrolyte. Discharge capability of the alkaline batteries varies depending on particle size of the zinc powder. For example, according to a known method, a specific surface area of the zinc powder is increased by increasing an amount of fine zinc powder in the zinc powder, thereby improving the high rate discharge capability (Patent Document 1).

However, the increase in specific surface area of the zinc powder causes an abrupt discharge reaction in the event of a short circuit, thereby resulting in generation of gas and heat. As a solution to this problem, Patent Documents 2 and 3 disclose a technology of containing fine zinc powder and coarse zinc powder in the zinc powder to reduce the generation of gas and heat, while maintaining the discharge capability.

CITATION LIST

Patent Document

Patent Document 1: Japanese Translation of PCT International Application No. 2001-512284
Patent Document 2: Japanese Patent Publication No. 2006-244989
Patent Document 3: Japanese Patent Publication No. 2004253276

SUMMARY OF THE INVENTION

Technical Problem

In addition to the problem of gas generation due to the increase in specific surface area of the zinc powder, the inventors of the present invention have found the following problems. Specifically, the improvement in high rate discharge capability is slowed when the amount of the fine zinc powder increased to increase the specific surface area exceeds a certain level, and the high rate discharge capability is inversely reduced when the amount of the fine zinc powder is further increased.

In view of the foregoing, the present invention has been achieved. A principal object of the invention is to provide an alkaline battery in which the high rate discharge capability is hardly reduced even when the specific surface area of the zinc powder is increased.

Solution to the Problem

An alkaline battery according to an aspect of the invention is an alkaline battery including a positive electrode and a negative electrode contained in a battery case with a separator interposed therebetween, wherein the positive electrode contains manganese dioxide and an alkaline electrolyte, the negative electrode is a gelled negative electrode containing zinc powder, a gelling agent, and an alkaline electrolyte, and the zinc powder contains 15% by mass or higher of fine powder with a particle size smaller than 200 mesh, and 10 to 35% by mass of coarse powder with a particle size of 20 to 80 mesh, and has a specific surface area in the range of 0.025 to 0.080 $m^2/g$.

The zinc powder preferably contains Al in the range of 80 to 800 ppm. Further, the zinc powder contains Bi in the range of 30 to 150 ppm.

In a preferred embodiment, the battery case is made of a closed-end, cylindrical case. An opening of the battery case is sealed with a sealing plate which functions as a negative electrode terminal. A bottom of the battery case functions as a positive electrode terminal, and includes a protrusion, and a shoulder which extends from a barrel of the battery case to the protrusion. The separator is a closed-end, cylindrical separator, and a gap between the shoulder of the battery case and a bottom of the separator is 0.5 mm or smaller. A graphite coating is preferably formed on an inner surface of the barrel of the battery case, and an inner surface of the bottom of the battery case.

Advantages of the Invention

According to the present invention, zinc powder which contains 15% by mass or higher of fine powder with a particle size smaller than 200 mesh, and 10 to 35% by mass of coarse powder with a particle size of 20 to 80 mesh, and has a specific surface area in the range of 0.025 to 0.080 $m^2/g$ is used in a negative electrode. This allows provision of an alkaline battery having improved high rate discharge capability.

BRIEF DESCRIPTION OF THE DRAWINGS

FIGS. 3(a) to 3(c) are views illustrating problems of the invention, in which

FIGS. 4(a) and 4(b) are views schematically illustrating the structure of a gelling agent, in which

DESCRIPTION OF EMBODIMENTS

Embodiments of the present invention will be described in detail below with reference to the drawings. The invention is not limited to the following embodiments. The disclosure of the invention can suitably be modified, or combined with other embodiments within the scope of the invention.

Figure 1:
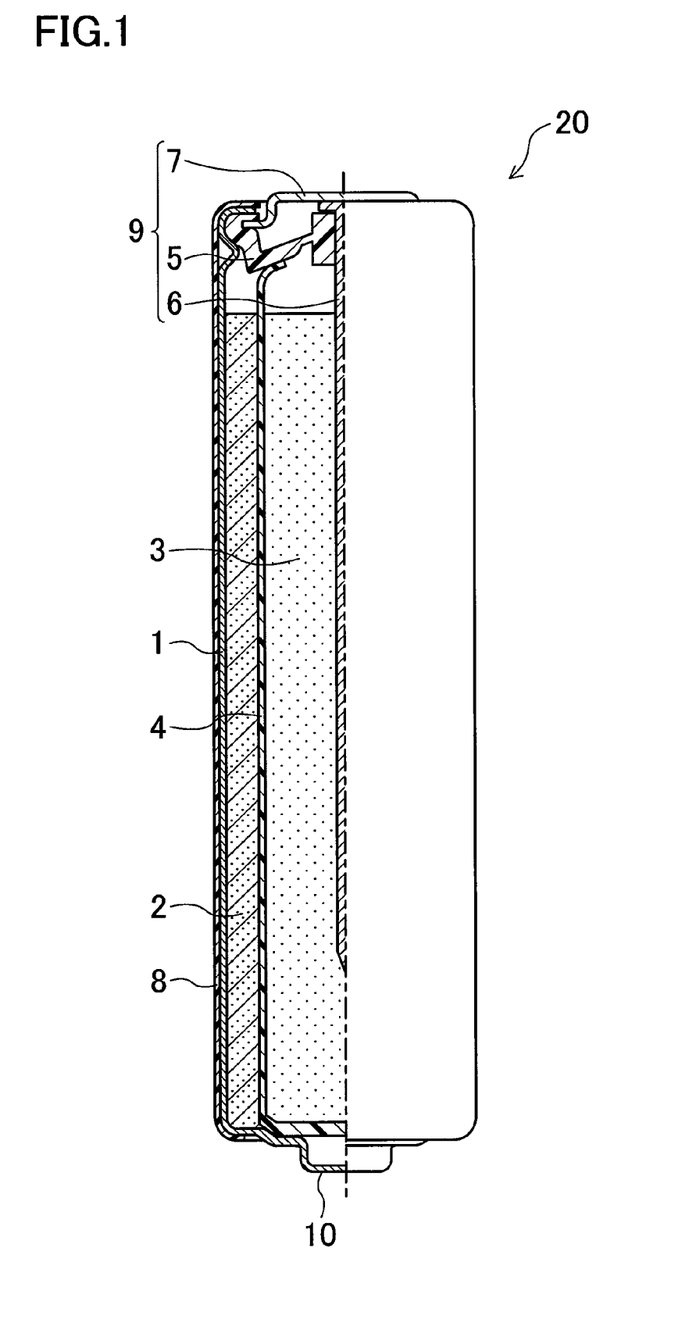
FIG. 1 is a half-sectional view illustrating the structure of an alkaline battery according to an embodiment of the invention.

FIG. 1 is a half-sectional view illustrating the structure of an alkaline battery 20 according to an embodiment of the invention. A positive electrode 2 and a gelled negative electrode 3 are contained in a closed-end, cylindrical battery case 1 with a separator 4 interposed therebetween The positive electrode 2 contains manganese dioxide and an alkaline electrolyte, and the gelled negative electrode 3 contains zinc powder, an alkaline electrolyte, and a gelling agent. An opening of the battery case 1 is sealed with a sealing member 9 integrated with a gasket 5, a current collector 6, and a sealing plate 7 which also functions as a negative electrode terminal. The battery case 1 also functions as part of the positive electrode, and includes a protrusion 10 as a positive electrode terminal at the bottom of the battery case 1. An outer circumferential surface of the battery case 1 is covered with an outer label 8.

The present invention is directed to particle size of the zinc powder contained in the gelled negative electrode 3. Before the description of the invention, how the inventors have achieved the invention will be described below.

The inventors of the present invention have made alkaline batteries 1 to 7 which were different in specific surface area of the zinc powder, and examined relation between the specific surface area of the zinc powder and high rate discharge capability.

Table 1 shows the results. The specific surface area of the zinc powder was changed by changing the content (% by mass) of fine powder of 200 mesh or smaller in the zinc powder. The zinc powder contained coarse powder of 20 to 80 mesh. The content of the coarse powder was fixed (5% by mass).

TABLE 1

| | Zinc powder | | | High rate |
|---|---|---|---|---|
| | Specific surface area [m²/g] | Coarse powder (20-80M) [% by mass] | Fine powder (<200M) [% by mass] | discharge capability [cycle] |
| Battery 1 | 0.014 | 5 | 8 | 97 |
| Battery 2 | 0.033 | 5 | 15 | 109 |
| Battery 3 | 0.043 | 5 | 20 | 113 |
| Battery 4 | 0.085 | 5 | 35 | 117 |
| Battery 5 | 0.093 | 5 | 40 | 118 |
| Battery 6 | 0.126 | 5 | 50 | 118 |
| Battery 7 | 0.145 | 5 | 60 | 116 |

The specific surface area of the zinc powder was measured by BET (Brunauer-Emmett-Teller) method. To evaluate the high rate discharge capability, high load pulse discharge was performed within a month after the battery was made (a cycle of two-second discharge at 1.5 W, and 28-second discharge at 0.65 W was performed 10 times per hour), and a duration of discharge (the number of cycles) until a closed circuit voltage reached 1.05 V was measured.

Figure 2:
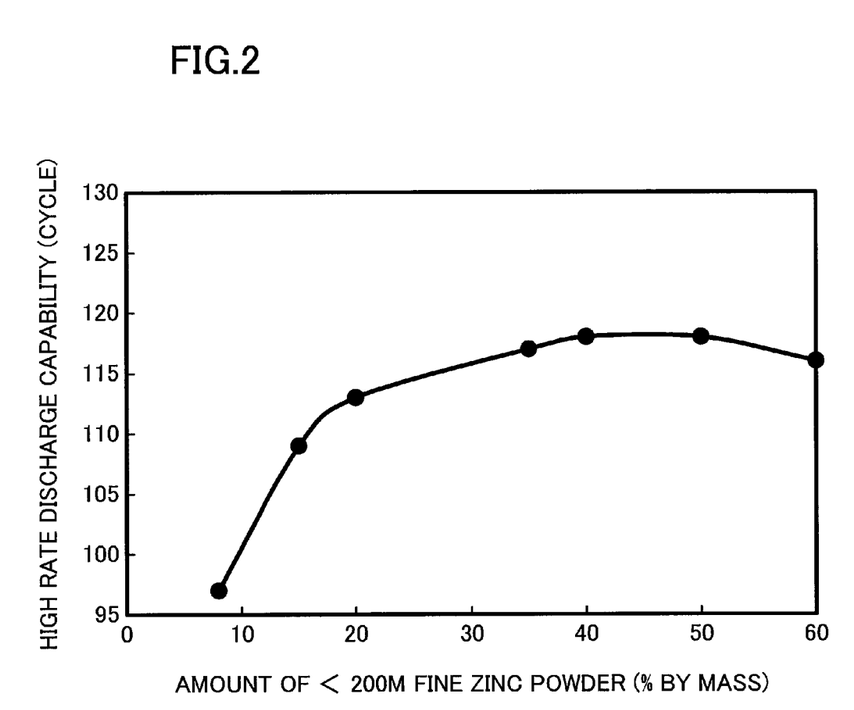
FIG. 2 is a graph illustrating relation between specific surface area of zinc powder and high rate discharge capability.

FIG. 2 is a graph illustrating relation between the specific surface area of the zinc powder and the high rate discharge capability shown in Table 1. A lateral axis of the graph indicates the amount of fine powder (smaller than 200 mesh) in place of the specific surface area. Since the amount of the coarse powder (20 to 80 mesh) was fixed, the relation between the specific surface area of the zinc powder and the high rate discharge capability corresponds with relation between the amount of the fine zinc powder and the high rate discharge capability.

As shown in FIG. 2, the high rate discharge capability improves as the amount of the fine zinc powder increases. However, the improvement in high rate discharge capability is gradually slowed when the amount of the fine zinc powder exceeds 15% by mass, and the high rate discharge capability is inversely reduced when the amount of the fine zinc powder exceeds 50% by mass.

The inventors of the present invention have analyzed battery 7 (containing fine powder of 60% by mass) that experienced the reduction in high rate discharge capability, and have found the followings.

A: Part of the gelled negative electrode 3 close to the positive electrode terminal 10 was significantly harder than part of the gelled negative electrode 3 close to the negative electrode terminal 7.

B: The gelled negative electrode 3 was reduced in height (a distance from a bottom of the separator 4 to an end of the gelled negative electrode close to the negative electrode terminal 7 in FIG. 1).

In order to analyze the two phenomena, height and moisture content of the gelled negative electrode 3 in each of batteries 1 to 7 shown in Table 1 were measured. The moisture content was measured in the following steps (1) to (8).

(1) Disassemble the alkaline battery from the side of the negative electrode terminal 7 to remove the sealing member 9.

(2) Hold the disassembled battery for 10 seconds with the side from which the sealing member 9 was removed faced downward, thereby allowing free fall of an electrolyte remaining free in the battery.

(3) Remove the gelled negative electrode 3 being contained inside the separator 4.

(4) Peel a side surface of the separator 4 (a surface in contact with the positive electrode 2), thereby exposing a side surface of the gelled negative electrode 3.

(5) Collect about 0.5 g of the gelled negative electrode 3 from part thereof including an end face near the negative electrode terminal 7 (an uppermost part), and from another part thereof including an end face near the positive electrode terminal 10 (a lowermost part), spread each of the collected samples in a Petri dish to a thickness not larger than 2 mm, and precisely measure weight of each sample.

(6) Dry the samples of the gelled negative electrode 3 in a thermostatic bath at 120° C. for 2 hours.

(7) Remove the samples from the thermostatic bath, leave the samples to cool for 5 minutes, and precisely measure the weight of each sample again.

(8) Obtain a decrease in mass from the weight measured in the step (5) to the weight measured in the step (7) as the moisture content in the gelled negative electrode 3.

Table 2 shows the results. As shown in Table 2, the height of the gelled negative electrode 3 decreases as the specific surface area of the zinc powder increases. Further, as the specific surface area of the zinc powder increases, a difference between the moisture content in part of the gelled negative electrode 3 near the negative electrode terminal 7 (the uppermost part) and the moisture content in part of the gelled negative electrode 3 near the positive electrode terminal 10 (the lowermost part) increases. This indicates that the lowermost part of the gelled negative electrode 3 was hardened as compared with the uppermost part of the gelled negative electrode 3.

TABLE 2

| | Height of gelled negative electrode | | Moisture content in gelled negative electrode | | |
|---|---|---|---|---|---|
| | Measured value [mm] | Decrease in height immediately after filling [mm] | Upper-most part [% by mass] | Lower-most part [% by mass] | Difference [% by mass] |
| Battery 1 | 43.0 | 0.0 | 35.4 | 35.3 | 0.1 |
| Battery 2 | 41.5 | −1.5 | 34.7 | 33.8 | 0.9 |
| Battery 3 | 40.9 | −2.1 | 34.6 | 33.0 | 1.6 |
| Battery 4 | 40.6 | −2.4 | 34.1 | 31.1 | 3.0 |
| Battery 5 | 40.3 | −2.7 | 33.7 | 29.0 | 4.7 |
| Battery 6 | 39.8 | −3.2 | 33.4 | 27.5 | 5.9 |
| Battery 7 | 39.3 | −3.7 | 33.0 | 26.2 | 6.8 |

As a result of various examinations, the inventors of the present invention have found that the se phenomena are derived from second pressing of a positive electrode pellet performed in the process of fabricating the alkaline battery.

Specifically, the positive electrode 2 of the alkaline battery 20 shown in FIG. 1 is formed in the following manner. First, a molded product which is molded by pressing a powdery mixture containing manganese dioxide and an alkaline electrolyte into a hollow cylindrical piece (a positive electrode pellet) is placed in the battery case 1, and the molded product is pressed again (re-pressed) to bring the molded product into close contact with the battery case 1. The second pressing of the molded product is performed with a center pin inserted in the hollow space in the molded product. The center pin is tapered at a distal end thereof for easy insertion into the hollow space in the molded product. Therefore, when the second pressing is performed from the end of the molded product, part of the molded product near the distal end of the center pin, i.e., part of the molded product near the positive electrode terminal 10, increases in volume. In addition, since the second pressing is performed from the end of the molded product near the negative electrode terminal 7, the pressure is not easily transferred to part of the molded product near the positive electrode terminal 10.

Figure 3:
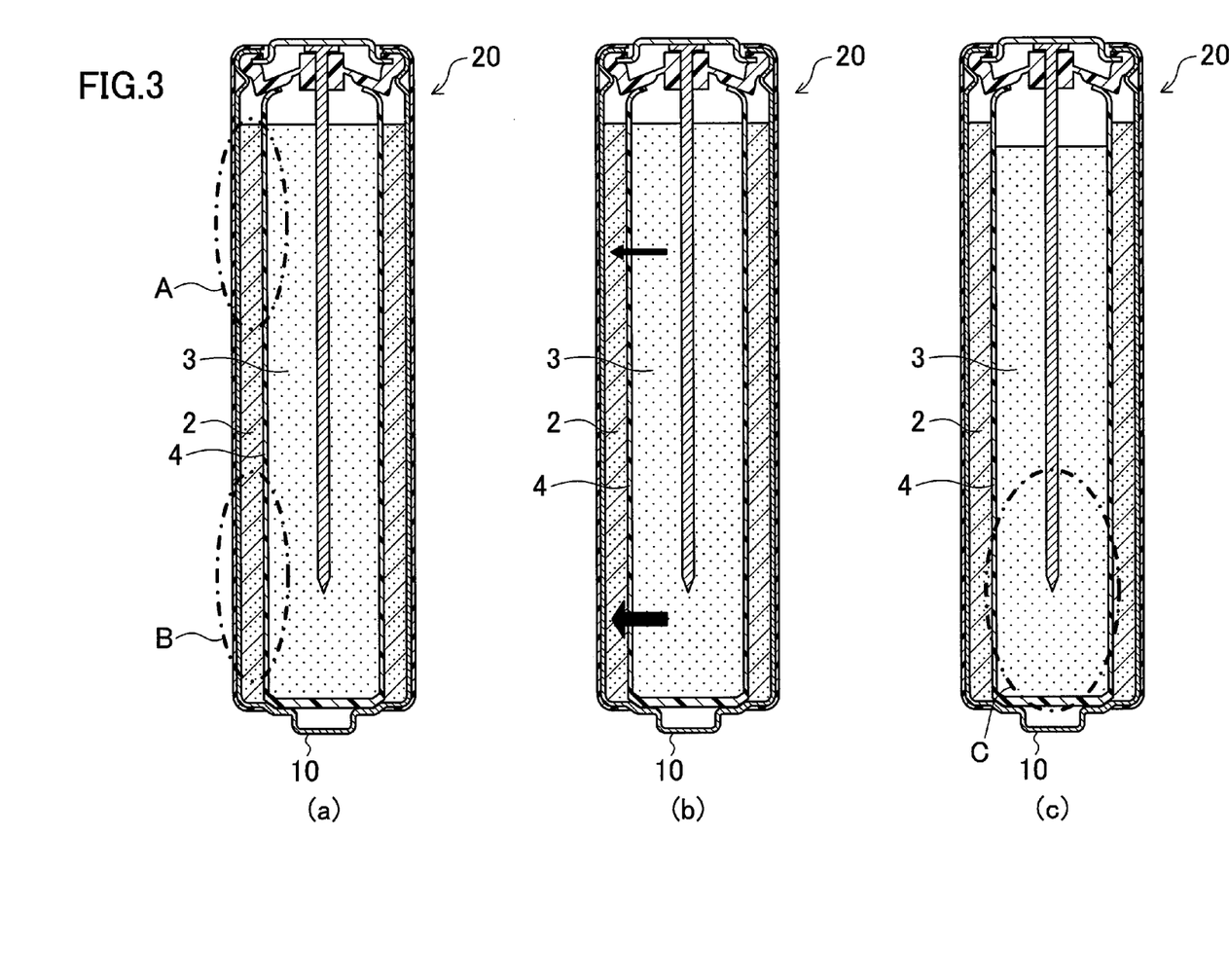
FIG. 3(a) shows parts of a positive electrode which experienced the second pressing, and are different in filling density.
FIG. 3(b) shows a difference in amount of an electrolyte transferred from a negative electrode to a positive electrode.
FIG. 3(c) shows the negative electrode reduced in height.

For the above-described reasons, in the positive electrode 2 contained in the battery case 1 shown in FIG. 3(a), part of the positive electrode 2 near the positive electrode terminal 10 indicated by a circle B is lower in density than part of the positive electrode 2 near the negative electrode terminal 7 indicated by a circle A.

Thus, as shown in FIG. 3(b), when the closed-end, cylindrical separator 4 is arranged inside the molded product which experienced the second pressing, and then the gelled negative electrode 3 is filled inside the separator 4 together with the alkaline electrolyte, the electrolyte contained in part of the gelled negative electrode 3 facing the part of the positive electrode 2 where the filling density is low (the part indicated by the circle B) is transferred to the positive electrode 2 in a larger amount than the electrolyte contained in part of the gelled negative electrode 3 facing the part of the positive electrode 2 where the filling density is high (the part indicated by the circle A).

As a result, as shown in FIG. 3(c), the amount of the electrolyte contained in part of the gelled negative electrode 3 near the positive electrode terminal 10 is reduced, and the part of the gelled negative electrode 3 near the positive electrode terminal 10 indicated by a circle C is hardened as compared with part of the gelled negative electrode 3 near the negative electrode terminal 7. Further, the height of the gelled negative electrode 3 is reduced due to the transfer of the electrolyte in the gelled negative electrode 3 to the positive electrode 2.

Thus, presumably, the electrolyte in the gelled negative electrode 3 is partially depleted by the phenomenon A, and an area in which the positive electrode 2 and the gelled negative electrode 3 face each other is reduced by the phenomenon B, thereby reducing the high rate discharge capability.

Based on the findings, the inventors of the present invention have considered that the phenomenon A can be reduced by reducing the local transfer of the electrolyte.

The inventors of the present invention have disclosed that the increase in specific surface area of the zinc powder reduces the capability of the gelling agent to hold the electrolyte in Japanese Patent Application No. 2008-59077. The capability of the gelling agent to hold the electrolyte will be described with reference to FIGS. 4(a) and 4(b).

Figure 4:
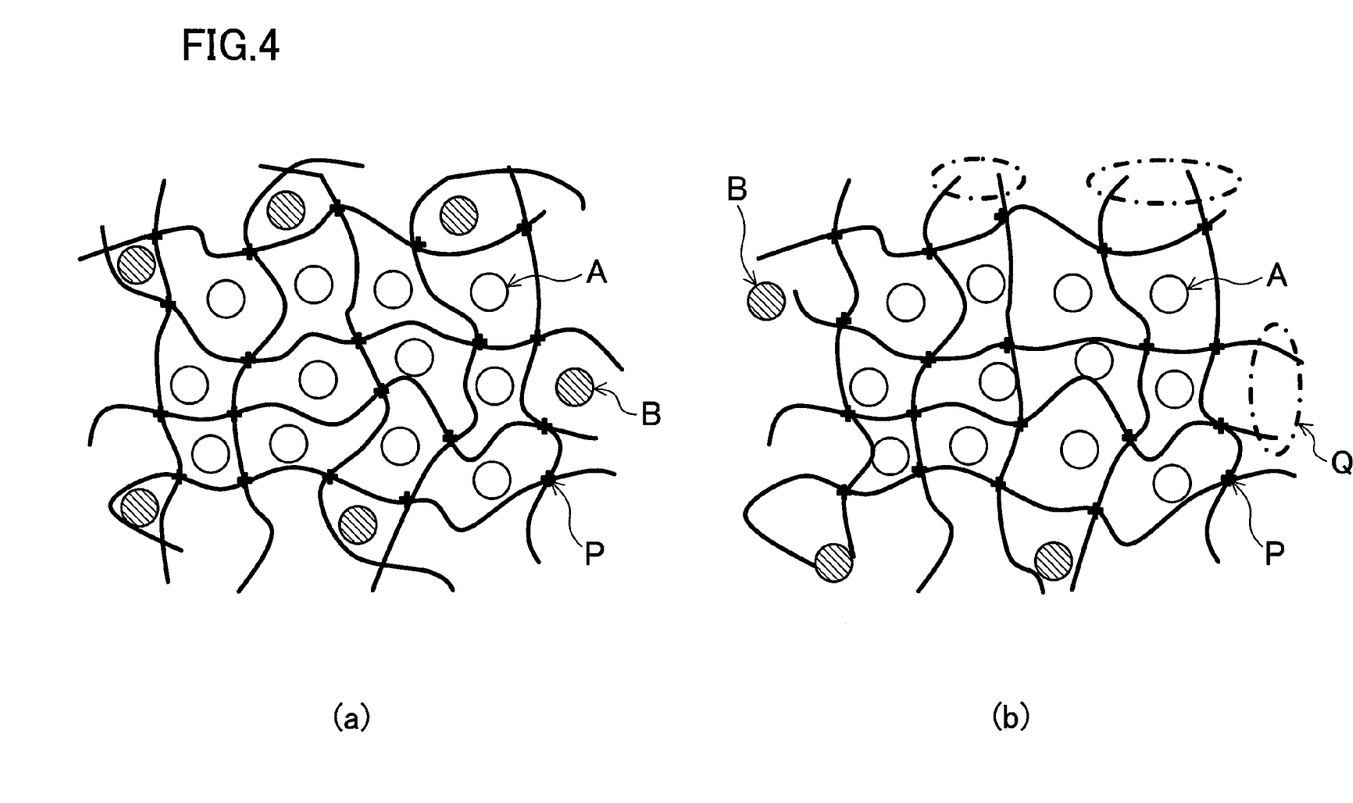
FIG. 4(a) shows the structure in which a specific surface area of zinc powder is small.
FIG. 4(b) shows the structure in which the specific surface area of the zinc powder is large.

FIGS. 4(a) and 4(b) schematically show the structure of the gelling agent (e.g., cross-linked poly(meth)acrylate). FIG. 4(a) shows the structure of the gelling agent with the zinc powder having a small specific surface area, and FIG. 4(b) shows the structure of the gelling agent with the zinc powder having a large specific surface area. In FIGS. 4(a) and 4(b), character P indicates a crosslink, A indicates an alkaline electrolyte captured in cross-linked space, and B indicates an alkaline electrolyte captured at a terminal end of a main chain. The alkaline electrolyte B captured at the terminal end of the main chain easily separate from the cross-linked network as compared with the alkaline electrolyte A captured in the cross-linked space.

Cross-linked poly(meth)acrylate has a carboxyl group in the main chain. The carboxyl group, which is a hydrophilic group, adsorbs and captures not only a molecule of water in the alkaline electrolyte, but also zinc. The amount of adsorbed water molecule and the amount of adsorbed zinc depend on a cardinal number of the carboxyl group, and are constant. Thus, the amount of zinc ads orbed by the terminal end of the main chain varies depending on the specific surface area of the zinc powder. When the specific surface area of the zinc powder increases, among the terminal ends of the main chain shown in FIG. 4(a) each of which adsorbs the alkaline electrolyte B, the terminal end of the main chain indicated by an arrow Q in FIG. 4(b) releases the alkaline electrolyte B, and adsorbs zinc (not shown) instead of the released alkaline electrolyte B. That is, the increase in specific surface area of the zinc powder reduces the capability of the gelling agent to hold the electrolyte.

For comparison of high rate discharge capability, alkaline batteries 1A, 5A, and 7A were prepared from batteries 1, 5, and 7 shown in Table 1 by increasing the amount of coarse zinc powder to relatively reduce the specific surface area.

Table 3 shows the results. As shown in Table 3, there was little difference in high rate discharge capability between battery 1 in which the specific surface area was small, and battery 1A prepared from battery 1 by increasing the amount of the coarse zinc powder to relatively reduce the specific surface area. As compared with batteries 5 and 7 in which the specific surface area was large, batteries 5A and 7A prepared from batteries 5 and 7 by increasing the amount of the coarse zinc powder to relatively reduce the specific surface area were improved in high rate discharge capability.

A possible cause of the results is as follows. As shown in Table 3, the height of the gelled negative electrode 3 was less reduced, and the difference in moisture content was reduced in batteries 5A and 7A. This indicates that the decrease in specific surface area of the zinc powder improves the capability of the gelling agent to hold the electrolyte, thereby alleviating the transfer of the electrolyte from the negative electrode to the positive electrode. In addition, the increase in amount of the coarse zinc powder which forms the framework structure of the gelled negative electrode synergistically and effectively alleviates the shrinkage of the gelled negative electrode even when the electrolyte is transferred from the negative electrode to the positive electrode.

As shown in Table 4, batteries 8 to 10 having a specific surface area of 0.085 $m^2/g$ were not improved in high rate discharge capability, although the amount of the coarse zinc powder was increased relative to battery 4 shown in Table 1 having the same specific surface area. When the specific surface area is significantly increased, the difference in moisture content in the gelled negative electrode becomes as large

TABLE 3

| | Zinc powder | | | Height of gelled negative electrode | | Moisture content in gelled negative electrode | | | High rate discharge capability [cycle] |
|---|---|---|---|---|---|---|---|---|---|
| | Specific surface area [$m^2/g$] | Coarse powder (20-80M) [% by mass] | Fine powder (<200M) [% by mass] | Measured value [mm] | Decrease in height immediately after filling [mm] | Uppermost part [% by mass] | Lowermost part [% by mass] | Difference [% by mass] | |
| Battery 1 | 0.014 | 5 | 8 | 43.0 | 0.0 | 35.4 | 35.3 | 0.1 | 97 |
| Battery 1A | 0.011 | 35 | 8 | 43.0 | 0.0 | 35.5 | 35.5 | 0.0 | 95 |
| Battery 5 | 0.093 | 5 | 40 | 40.3 | −2.7 | 33.7 | 29.0 | 4.7 | 118 |
| Battery 5A | 0.048 | 35 | 40 | 41.6 | −1.4 | 34.7 | 33.2 | 1.5 | 120 |
| Battery 7 | 0.145 | 5 | 60 | 39.3 | −3.7 | 33.0 | 26.2 | 6.8 | 116 |
| Battery 7A | 0.080 | 35 | 60 | 41.8 | −1.2 | 34.3 | 31.8 | 2.5 | 124 |

Based on these findings, the inventors of the present invention have conducted an experiment to find the optimum range of the specific surface area of the zinc powder, and the optimum range of the amount of the coarse zinc powder in an alkaline battery including a negative electrode containing zinc powder having a relatively large specific surface area for the purpose of improving the high rate discharge capability.

Table 4 shows the experimental results. The specific surface area of the zinc powder is determined by the mixing ratio between the amount of fine powder (smaller than 200 mesh and the amount of coarse powder (20 to 80 mesh). In this experiment, the amount of the coarse powder was changed within the predetermined range (0 to 37% by mass), and the amount of the fine powder was changed in accordance with the amount of the coarse powder to obtain zinc powder samples of the predetermined specific surface area as 5% by mass. In this state, the increase in amount of the coarse zinc powder is no longer advantageous.

Among batteries 11 to 15 having a specific surface area of 0.080 $m^2/g$, batteries 12 to 14 in which the amount of the coarse zinc powder was controlled in the range of 10 to 35% by mass were improved in high rate discharge capability. Likewise, among batteries 16 to 20 having a specific surface area of 0.050 $m^2/g$, and among batteries 21 to 25 having a specific surface area of 0.025 $m^2/g$, batteries 17 to 19, and batteries 22 to 24 in which the amount of the coarse zinc powder was controlled in the range of 10 to 35% by mass were improved in high rate discharge capability.

However, the batteries were not improved in high rate discharge capability when the amount of the coarse zinc powder was increased to 37% by mass, irrespective of the

TABLE 4

| | Zinc powder | | | Height of gelled negative electrode | | Moisture content in gelled negative electrode | | | High rate discharge capability [cycle] |
|---|---|---|---|---|---|---|---|---|---|
| | Specific surface area [$m^2/g$] | Coarse powder (20-80M) [% by mass] | Fine powder (<200M) [% by mass] | Measured value [mm] | Decrease in height immediately after filling [mm] | Uppermost part [% by mass] | Lowermost part [% by mass] | Difference [% by mass] | |
| Battery 8 | 0.085 | 0 | 33 | 40.7 | −2.4 | 34.1 | 29.2 | 4.9 | 113 |
| Battery 9 | 0.085 | 10 | 38 | 40.7 | −2.3 | 34.2 | 29.1 | 5.1 | 117 |
| Battery 10 | 0.085 | 20 | 43 | 40.9 | −2.1 | 34.2 | 29.0 | 5.2 | 117 |
| Battery 11 | 0.080 | 0 | 31 | 40.9 | −2.1 | 34.3 | 31.8 | 2.5 | 112 |
| Battery 12 | 0.080 | 10 | 36 | 41.1 | −2.0 | 34.2 | 32.0 | 2.2 | 121 |
| Battery 13 | 0.080 | 23 | 46 | 41.3 | −1.7 | 34.0 | 31.7 | 2.3 | 122 |
| Battery 14 | 0.080 | 35 | 60 | 41.8 | −1.2 | 34.3 | 31.8 | 2.5 | 124 |
| Battery 15 | 0.080 | 37 | 63 | 41.8 | −1.2 | 34.3 | 32.0 | 2.3 | 124 |
| Battery 16 | 0.050 | 0 | 23 | 41.0 | −2.0 | 34.6 | 33.0 | 1.6 | 113 |
| Battery 17 | 0.050 | 10 | 25 | 41.2 | −1.8 | 34.5 | 33.0 | 1.5 | 118 |
| Battery 18 | 0.050 | 23 | 33 | 41.4 | −1.6 | 34.4 | 32.7 | 1.7 | 119 |
| Battery 19 | 0.050 | 35 | 41 | 41.6 | −1.4 | 34.5 | 32.9 | 1.6 | 121 |
| Battery 20 | 0.050 | 37 | 43 | 41.7 | −1.4 | 34.5 | 32.9 | 1.6 | 121 |
| Battery 21 | 0.025 | 0 | 14 | 42.2 | −0.8 | 34.9 | 34.4 | 0.5 | 103 |
| Battery 22 | 0.025 | 10 | 15 | 42.4 | −0.6 | 35.0 | 34.2 | 0.8 | 112 |
| Battery 23 | 0.025 | 23 | 21 | 42.5 | −0.5 | 35.1 | 34.5 | 0.6 | 115 |
| Battery 24 | 0.025 | 35 | 27 | 42.6 | −0.5 | 35.0 | 34.3 | 0.7 | 117 |
| Battery 25 | 0.025 | 37 | 28 | 42.6 | −0.4 | 35.1 | 34.5 | 0.6 | 117 |
| Battery 26 | 0.020 | 10 | 11 | 42.9 | −0.1 | 35.1 | 34.7 | 0.4 | 92 |
| Battery 27 | 0.020 | 0 | 10 | 42.8 | −0.2 | 35.1 | 34.6 | 0.5 | 98 |
| Battery 28 | 0.020 | 37 | 18 | 42.9 | −0.1 | 35.1 | 34.7 | 0.4 | 107 | specific surface area. Thus, the amount of the coarse zinc powder required to maintain the framework structure of the gelled negative electrode 3 is considered as 35% by mass because there was no great difference in decrease in height immediately after filling between batteries 14 and 15, between batteries 19 and 20, and between batteries 24 and 25. When the amount of the coarse zinc powder exceeds 35% by mass, the amount of the fine powder decreases. This makes it difficult to keep the specific surface area which contributes to the improvement in high rate discharge capability.

In batteries 26 to 28 having a specific surface area of 0.020 $m^2/g$, the increase in amount of the coarse zinc powder did not provide sufficient high rate discharge capability because the specific surface area was too small.

The above-described results indicate that in an alkaline battery including a negative electrode containing zinc powder having a relatively large specific surface area, the zinc powder preferably contains 10 to 35% by mass of 20 to 80 mesh coarse powder, and has a specific surface area in the range of 0.025 to 0.080 $m^2/g$ for the purpose of improving the high rate discharge capability.

Specifically, with use of the zinc powder that satisfies the above-described conditions, the capability of holding the alkaline electrolyte in the gelled negative electrode is improved by reducing the specific surface area of the zinc powder, and the shrinkage of the gelled negative electrode resulting from the increase in amount of the coarse zinc powder is synergistically alleviate d. As a result, the high rate discharge capability of the alkaline battery is improved.

The improvement in high rate discharge capability by using the zinc powder that satisfies the above-described conditions is gradually slowed after the amount of fine zinc powder exceeds 15% by mass as shown in FIG. 2. Thus, the high rate discharge capability is improved when the zinc powder contains 15% by mass or higher of the fine zinc powder with a particle size smaller than 200 mesh. Specifically, in a battery including a negative electrode containing the above-described amount of fine powder in the zinc powder, the high rate discharge capability is improved by setting the amount of the coarse powder in the zinc powder, and the specific surface area of the zinc powder within the predetermined ranges (batteries 12-15, 17-19, 22-24) as shown in Table 4 (battery 22 contains the smallest fine powder amount of 15% by mass).

When the zinc powder that satisfies the above-described conditions is used in the negative electrode, a difference between the moisture content in an uppermost part of the gelled negative electrode and the moisture content in a lowermost part of the gelled negative electrode is 2.5% by mass or smaller.

The zinc powder of the present invention is obtained by, for example, melting zinc with a purity of 99.99 or higher at about 500° C., and spraying the melt in the form of high pressure gas by atomization. However, the zinc powder may be obtained by a different method. The zinc powder may be zinc alloy powder containing elements such as indium, bismuth, aluminum, etc. Use of the zinc alloy powder alleviates corrosion of zinc, thereby preventing generation of hydrogen gas.

When a zinc alloy is formed by adding Al to zinc, a surface of the zinc alloy powder is smoothened. Therefore, with the particle distribution unchanged, the specific surface area of the zinc alloy powder can effectively be reduced by increasing the amount of Al added. This can improve the capability of holding the alkaline electrolyte in the gelled negative electrode.

Further, Bi easily segregates at a grain boundary of the zinc alloy. Thus, when a certain amount or more of Bi is added to the zinc powder, Bi segregates, and is scattered on a surface of the zinc alloy powder, there by roughing the surface. Therefore, with the particle distribution unchanged, the specific surface area of the zinc alloy powder can effectively be reduced by reducing the amount of Bi added. This can improve the capability of holding the alkaline electrolyte in the gelled negative electrode.

Table 5 shows the high rate discharge capability, the height of the gelled negative electrode, and the moisture content in the gelled negative electrode measured in alkaline batteries each of which includes a gelled negative electrode containing zinc alloy powder prepared by adding Al and Bi to zinc. For reference, Table 5 also shows the results of battery 12 shown in Table 3.

TABLE 5

| | Zinc powder | | | | | Height of gelled negative electrode | | Moisture content in gelled negative electrode | | | |
| --- | --- | --- | --- | --- | --- | --- | --- | --- | --- | --- | --- |
| | Specific surface area [$m^2/g$] | Coarse powder (20-80M) [% by mass] | Fine powder (<200M) [% by mass] | Al [ppm] | Bi [ppm] | Measured value [mm] | Decrease in height immediately after filling [mm] | Uppermost part [% by mass] | Lowermost part [% by mass] | Difference [% by mass] | High rate discharge capability [cycle] |
| Battery 12 | 0.080 | 10 | 36 | 80 | 150 | 41.1 | −2.0 | 34.2 | 32.0 | 2.2 | 121 |
| Battery 29 | 0.077 | 10 | 36 | 400 | 150 | 41.1 | −1.9 | 34.4 | 32.3 | 2.1 | 124 |
| Battery 30 | 0.072 | 10 | 36 | 800 | 150 | 41.2 | −1.8 | 34.7 | 32.4 | 1.8 | 125 |
| Battery 12 | 0.080 | 10 | 36 | 80 | 150 | 41.1 | −2.0 | 34.2 | 32.0 | 2.2 | 121 |
| Battery 31 | 0.078 | 10 | 36 | 80 | 80 | 41.1 | −1.9 | 34.5 | 32.3 | 2.2 | 127 |
| Battery 32 | 0.074 | 10 | 36 | 80 | 30 | 41.2 | −1.8 | 34.6 | 32.7 | 1.9 | 128 |

As shown in Table 5, with the predetermined ratio between the coarse powder and the fine powder in the zinc powder, the specific surface area was reduced in batteries 29 and 30 in each of which the Al amount was increased relative to the Al amount in battery 12, thereby improving the high rate discharge capability as compared with that of battery 12. This indicates that the zinc powder preferably contains Al in the range of 80 to 800 ppm.

Further, as shown in Table 5, with the predetermined ratio between the coarse powder and the fine powder in the zinc powder, the specific surface area was reduced in batteries 31 and 32 in each of which the Bi amount was reduced relative to the Bi amount in battery 12, thereby improving the high rate discharge capability as compared with that of battery 12. This indicates that the zinc powder preferably contains Bi in the range of 30 to 150 ppm.

As shown in FIGS. 3(a) and 3(b), the electrolyte contained in part of the gelled negative electrode 3 facing part of the positive electrode 2 in which the filling density is low (part indicated by a circle B) is transferred in a larger amount than the electrolyte contained in part of the gelled negative electrode 3 facing part of the positive electrode 2 where the filling density is high (part indicated by a circle A).

Figure 5:
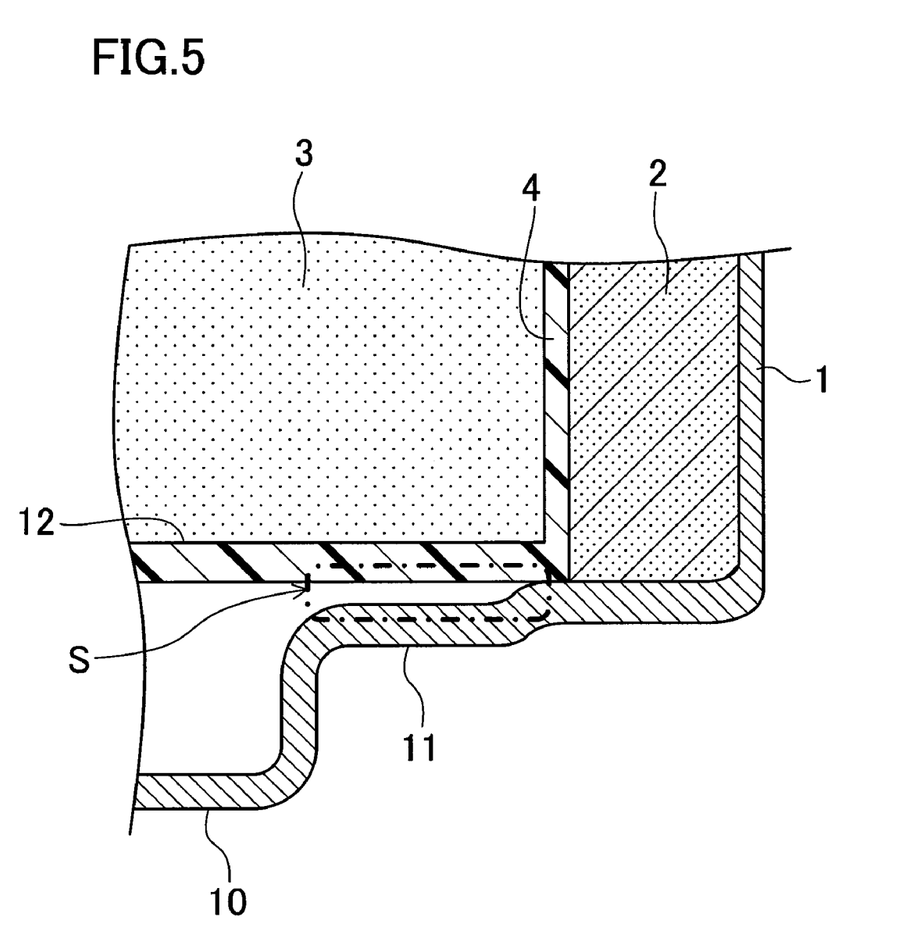
FIG. 5 is a partial cross-sectional view illustrating an enlargement of the vicinity of a positive electrode terminal (a protrusion) of the alkaline battery.

FIG. 5 is a partial cross-sectional view illustrating an enlargement of the vicinity of the protrusion 10 which functions as a positive electrode terminal of the alkaline battery shown in FIG. 1. In general, a bottom of the battery case 1 includes the protrusion 10 which functions as the positive electrode terminal, and a shoulder 11 which extends from a barrel of the battery case 1 to the protrusion 10. The separator 4 is a closed-end, cylindrical separator, and there is a gap S between the shoulder 11 of the battery case 1 and the bottom of the separator 4 as indicated by an arrow.

The electrolyte which penetrated the separator 4 accumulates in the gap S. The electrolyte accumulated therein is transferred to the part of the positive electrode 2 where the filling density is low. Therefore, if the transfer of the electrolyte can be alleviated, the amount of the electrolyte transferred from the gelled negative electrode 3 to the positive electrode 2 can generally be reduced.

Further, a graphite coating is generally formed on an inner surface of the barrel of the battery case 1 to reduce contact resistance between the positive electrode 2 and the battery case 1. The graphite coating is water repellent. Therefore, when the graphite coating is formed not only on the inner surface of the barrel of the battery cue 1, but also on an inner surface of the bottom of the battery case including the shoulder 11, the electrolyte is less likely to accumulate in the gap S shown in FIG. 5. This can alleviate the transfer of the electrolyte accumulated in the gap S to the part of the positive electrode 2 where the filling density is low.

Table 6 shows the high rate discharge capability, the height of the gelled negative electrode, and the moisture content in the gelled negative electrode measured in alkaline batteries, in which the size of the gap between the shoulder 11 of the battery case 1 and the bottom of the separator 4 was changed, and the graphite coating was formed also on the inner surface of the bottom of the battery case 1. For reference, Table 6 also shows the results of battery 12 shown in Table 3.

TABLE 6

| | Zinc powder | | | | Height of gelled negative electrode | | Moisture content in gelled negative electrode | | | |
|---|---|---|---|---|---|---|---|---|---|---|
| | Specific surface area [m²/g] | Coarse powder (20-80M) [% by mass] | Fine powder (<200M) [% by mass] | Battery case | | | Uppermost part [% by mass] | Lowermost part [% by mass] | Difference [% by mass] | High rate discharge capability [cycle] |
| | | | | Gap [mm] | Graphite coating | Measured value [mm] | Decrease in height immediately after filling [mm] | | | | |
| Battery 12 | 0.080 | 10 | 36 | 0.50 | Side surface only | 41.1 | −2.0 | 34.2 | 32.0 | 2.2 | 121 |
| Battery 33 | 0.080 | 10 | 36 | 0.25 | Side surface only | 41.2 | −1.8 | 34.3 | 32.4 | 1.9 | 123 |
| Battery 34 | 0.080 | 10 | 36 | 0.00 | Side surface only | 41.4 | −1.7 | 34.1 | 32.7 | 1.4 | 126 |
| Battery 12 | 0.080 | 10 | 36 | 0.50 | Side surface only | 41.1 | −2.0 | 34.2 | 32.0 | 2.2 | 121 |
| Battery 35 | 0.080 | 10 | 36 | 0.50 | Side surface/ bottom/ surface | 41.1 | −1.9 | 34.1 | 32.1 | 2.0 | 124 |
| Battery 36 | 0.080 | 10 | 36 | 0.00 | Side surface/ bottom surface | 41.4 | −1.6 | 34.2 | 32.6 | 1.6 | 127 |

As shown in Table 6, batteries 33 and 34 in each of which the gap between the shoulder 11 of the battery case 1 and the bottom of the separator 4 was reduced relative to the gap in battery 12 were improved in high rate discharge capability as compared with that of battery 12. This indicates that the gap between the shoulder 11 of the battery case 1 and the bottom of the separator 4 is preferably 0.5 mm or smaller.

Further, as shown in Table 6, batteries 35 and 36 in each of which the graphite coating was formed also on the inner surface of the bottom of the battery case 1 unlike batteries 12 and 34 were improved in high rate discharge capability as compared with that of batteries 12 and 34. This indicates that the graphite coating is preferably formed on the inner surfaces of the barrel and the bottom of the battery case 1.

The gelling agent contained in the gelled negative electrode 3 is capable of holding the electrolyte in the gelled negative electrode 3 as described above. However, inherently, the gelling agent does not contribute to the discharge reaction. Thus, the high rate discharge capacity can be improved by reducing the amount of the gelling agent with the specific surface area of the zinc powder, and the amounts of the coarse powder and the fine powder controlled within the predetermined ranges, respectively.

Table 7 shows the high rate discharge capability, the height of the gelled negative electrode, and the moisture content in the gelled negative electrode measured in alkaline batteries in which the content of the gelling agent in the gelled negative electrode 3 was changed. For reference, Table 7 also shows the results of battery 12 shown in Table 3.

TABLE 7

| | Zinc powder | | | | Height of gelled negative electrode | | Moisture content in gelled negative electrode | | | |
|---|---|---|---|---|---|---|---|---|---|---|
| | Specific surface area [m²/g] | Coarse powder (20-80M) [% by mass] | Fine powder (<200M) [% by mass] | Gelling agent Content [% by mass] | Measured value [mm] | Decrease in height immediately after filling [mm] | Uppermost part [% by mass] | Lowermost part [% by mass] | Difference [% by mass] | High rate discharge capability [cycle] |
| Battery 12 | 0.080 | 10 | 36 | 2.65 | 41.1 | −2.0 | 34.2 | 32.0 | 2.2 | 121 |
| Battery 37 | 0.080 | 10 | 36 | 2.35 | 41.0 | −2.0 | 33.2 | 30.8 | 2.4 | 123 |
| Battery 38 | 0.080 | 10 | 36 | 1.80 | 41.0 | −2.0 | 32.8 | 30.4 | 2.4 | 127 |

As shown in Table 7, batteries 37 and 38 in each of which the content of the gelling agent was reduced relative to that in the battery 12 were improved in high rate discharge capability as compared with that of the battery 12. This indicates that the negative electrode 3 preferably contains the gelling agent in an amount of 1.8 to 2.65% by mass relative to the alkaline electrolyte in the gelled negative electrode.

The preferred embodiments have been set forth to describe the present invention. However, the invention is not limited to the description, and may be modified in various ways.

INDUSTRIAL APPLICABILITY

The present invention is useful for alkaline batteries intended for high rate discharge.

DESCRIPTION OF REFERENCE CHARACTERS

| | |
|---|---|
| 1 | Battery case |
| 2 | Positive electrode |
| 3 | Gelled negative electrode |
| 4 | Separator |
| 5 | Gasket |
| 6 | Current collector |
| 7 | Negative electrode terminal (sealing plate) |
| 8 | Outer label |
| 9 | Sealing member |
| 10 | Positive electrode terminal (protrusion) |
| 11 | Shoulder |
| 20 | Alkaline battery |

The invention claimed is:

1. An alkaline battery comprising:
a positive electrode and a negative electrode contained in a battery case with a separator interposed therebetween, wherein
the positive electrode contains manganese dioxide and an alkaline electrolyte,
the negative electrode is a gelled negative electrode containing zinc powder, a gelling agent, and an alkaline electrolyte, and
the zinc powder contains 15% by mass or higher of fine powder with a particle size smaller than 200 mesh, and 10 to 35% by mass of coarse powder with a particle size of 20 to 80 mesh, and has a specific surface area in the range of 0.025 to 0.080 m²/g.

2. The alkaline battery of claim 1, wherein
the zinc powder contains Al in the range of 80 to 800 ppm.

3. The alkaline battery of claim 1, wherein
the zinc powder contains Bi in the range of 30 to 150 ppm.

4. The alkaline battery of claim 1, wherein
the battery case is made of a closed-end, cylindrical case which functions as part of a positive electrode terminal, and an opening of the battery case is sealed with a sealing plate which functions as a negative electrode terminal,
a bottom of the battery case includes a protrusion which functions as the positive electrode terminal, and a shoulder which extends from a barrel of the battery case to the protrusion, and
the separator is a closed-end, cylindrical separator, and a gap between the shoulder of the battery case and a bottom of the separator is 0.5 mm or smaller.

5. The alkaline battery of claim 4, wherein
a graphite coating is formed on an inner surface of the barrel of the battery case, and an inner surface of the bottom of the battery case.

6. The alkaline battery of claim 1, wherein
the negative electrode contains the gelling agent in an amount of 1.8 to 2.65% by mass relative to the alkaline electrolyte in the gelled negative electrode.

7. The alkaline battery of claim 1, wherein
a difference between moisture content in an uppermost part of the gelled negative electrode and moisture content in a lowermost part of the gelled negative electrode is 2.5% by mass or smaller.

* * * * *